United States Patent [19]
Benner et al.

[11] 3,856,544
[45] Dec. 24, 1974

[54] FIBER-REINFORCED CALCIUM SILICATE HYDRATE INSULATION

[75] Inventors: Stanley G. Benner, Littleton, Colo.; Kenneth F. Greene, Somerville, N.J.

[73] Assignee: Johns-Manville Corporation, Arapahoe County, Colo.

[22] Filed: Aug. 6, 1973

[21] Appl. No.: 386,132

[52] U.S. Cl. .............................................. 106/120
[51] Int. Cl. ........................................... C04b 15/06
[58] Field of Search .................................... 106/120

[56] References Cited
UNITED STATES PATENTS

| | | | |
|---|---|---|---|
| 3,501,323 | 3/1970 | Moorehead | 106/120 |
| 3,679,446 | 7/1972 | Kubo | 106/120 |

*Primary Examiner*—J. Poer
*Attorney, Agent, or Firm*—Robert M. Krone; James W. McClain

[57] ABSTRACT

An improved process is described for the "preautoclaved" production of calcium silicate hydrate thermal insulation. The improvement comprises the incorporation into the slurry of calcium silicate hydrate crystals 1–10 weight percent of poly(ethylene terephthalate) fibers of defined size. An improved insulation product containing these fibers is also described. In a preferred form, the slurry and product also contain glass fiber.

9 Claims, No Drawings

FIBER-REINFORCED CALCIUM SILICATE HYDRATE INSULATION

BACKGROUND OF THE INVENTION

1. Field of the Invention

The invention herein relates to light weight calcium silicate hydrate insulation. More particularly, it relates to such insulation containing organic fibrous reinforcement.

Light weight calcium silicate hydrate thermal insulation has been in use for a number of years. Until recently such insulation was normally made by reacting lime and a siliceous material in situ in an aqueous solution in a mold having the shape of the finished product. In some instances, fibrous reinforcement was added to the reaction mixture. Because of the severity of the reaction conditions, however, only highly resistant inorganic fibers, such as asbestos fibers, could be used since most other fibers, including essentially all organic fibers, were destroyed by the reaction.

Subsequently several processes have been developed wherein lime and the siliceous material are first reacted under hydrothermal conditions to produce an aqueous slurry of calcium silicate hydrate crystals. These crystals are then molded to the desired shape and the molded product is dried to produce the insulation material. Fibrous materials resistant to the severe conditions of the hydrothermal reaction may be added to the reaction mixture. Prior art also discloses that fibrous materials, including organic fibers, can be added to the slurry of calcium silicate hydrate crystals following reaction of the lime and siliceous material but prior to molding of the crystalline mass.

2. Description of Prior Art

The older processes of reacting the lime and siliceous material in situ in a mold are typified by the processes described in U.S. Pat. Nos. 2,215,891; 2,432,981; 2,540,354; 2,547,127; 2,665,996; 2,716,070; 2,748,008; 2,888,377; 3,116,158 and 3,449,141. The more recent processes of reacting the lime and siliceous material to form the calcium silicate hydrate crystals and then molding the crystals (sometimes referred to as "preautoclaving") are typified by the process described in U.S. Pat. Nos. 3,501,324 and 3,679,446. Incorporation of fibrous reinforcement is also described in these two patents. In addition, a typical preautoclaving process is known to have been practiced commercially in Australia for a number of years.

BRIEF SUMMARY OF THE INVENTION

It is an object of this invention to provide an improved fiber reinforced calcium silicate hydrate insulating product.

It is also an object of this invention to provide a fibrous reinforced insulating product which has both green and dry strength.

It is further an object of this invention to provide a fibrous reinforced insulating product which has relatively high temperature resistance and is thus amenable to more rapid drying of the green structure at higher oven drying temperatures.

The invention herein is an improvement in the process of manufacturing calcium silicate hydrate insulation. It also encompasses an improved insulating product.

In particular, in a process for forming calcium silicate hydrate insulation which comprises reacting lime and a siliceous material under hydrothermal conditions in aqueous solution to produce an aqueous slurry of calcium silicate hydrate crystals, with subsequent molding of the crystals to a desired shape and drying of the shape-molded product to form a shaped object of light weight calcium silicate hydrate suitable for use as thermal insulation, the invention herein comprises the improvement of incorporating into the aqueous slurry of calcium silicate hydrate crystals 1 to 10 weight percent of polyethylene terephthalate) fibers, the fibers having a length from ⅛ to 1 inch and a denier of from 0.5 to 5. In a preferred embodiment, up to 60% of the poly-(ethylene terephthalate) fibers may be replaced by glass fibers of 5 to 15 microns diameter, and preferably being C or E glass.

DETAILED DESCRIPTION AND PREFERRED EMBODIMENTS

Since the invention herein resides in an improvement on a known process and insulating product, both of which are well described in the literature (see above) the basic product and process will only be summarized in this specification. The basic reactants comprise lime and a siliceous material, such as silica, diatomite or the like. These are usually present in approximately equal molar amounts, although the mol ratios can range from 0.6 to 1.3 parts of lime per part of the siliceous material. These reactants are dispersed in an aqueous slurry, which may range from 5 to 20 parts by weight of water per part by weight of solids. This slurry is placed in an autoclave or similar pressurized reaction vessel and subjected to elevated temperature and pressure for a period of several hours to cause the lime and siliceous material to react to form one or more of the crystalline forms of calcium silicate hydrate. Commonly, the hydrothermal reaction temperature and pressure are provided by the use of staturated steam. Saturation pressures are usually in excess of 70 psig and are commonly higher than 150 psig with the attendant saturation temperatures. Reaction times range from about ½ to 20 hours and are commonly in the range of from 2 to 8 hours.

Following the hydrothermal reaction the product is recovered as a slurry of calcium silicate hydrate crystals. There are a number of varieties of crystalline calcium silicate hydrates, and the lines of demarkation among the crystalline phases are not distinct. Consequently, under any given set of reaction conditions of temperature, pressure and time the product slurry may contain more than one crystalline phase, although ordinarily it will be found that one phase predominates over the remaining phases in the mixture. Under the reaction conditions commonly used in the reaction here involved, the two most common forms of calcium silicate hydrate to be formed are tobermorite and xonotlite. The reaction conditions best suited to formation of these crystalline phases are widely described in the literature; see e.g., H. Taylor, The Chemistry of Cements, vol. 1, page 215 (1964). It has previously been disclosed in U.S. Pat. No. 3,679,446 that at this point in the process fibrous reinforcement may be added. Thereafter the slurry is formed into the desired insulating shape by any of a number of conventional methods, such as by filter molding, pressure molding, casting or other known methods. The molded shape is then dried, either under ambient conditions or in a drying oven under elevated temperature conditions. Oven drying is generally preferred because of the shortened drying time and because drying conditions can be carefully controlled. Dry densities of the resulting products are in the range of 11–18 lbs/ft³, usually 12–16 lbs/ft³.

The invention herein resides in an improvement in the above described process and the product obtained therefrom. The improvement in the process comprises the step of incorporating into the slurry of calcium silicate hydrate crystals 1 to 10 weight percent, based on solids, a poly(ethylene terephthalate) fiber of a defined length and denier. This fiber has been found to be unexpectedly superior to organic fibers such as rayon, in that it not only provides good green and dry strength to the insulation but it also has superior temperature resistance, thus providing reinforcement to the insulating block when the latter is in service under conditions in which organic fibers such as rayon would be substantially degraded. The improved insulating product comprises a calcium silicate hydrate insulating body, having therein 1 to 10% by weight of poly(ethylene terephthalate) reinforcing fiber of the same defined dimensions. Such a block is handleable while still green and when dry retains a high degree of reinforcement, even at operating temperatures at which organic fibers such as rayon would be degraded.

Poly(ethylene terephthalate) fibers are commercially available under the trademark "Dacron" from the du Pont Company. Typical properties of poly(ethylene terephthalate) fibers will be found described in *Plastics* [London], 18, 17(1953) and *Chemical Age*, 68, 8(1953).

Those fibers suitable for use in the present invention will have a length from ⅛ to 1 inch, preferably from about ¼ to ½ inch. They will also have a denier of from 0.5 to 5, preferably of from 1 to 3. Fibers smaller than the indicated sizes do not provide adequate reinforcement to the shaped product, while those larger are too bulky and tend to become entangled, thus interfering with molding of the shaped product. The poly(ethylene terephthalate) reinforcing fiber will be present as from 1 to 10 weight percent of the finished composition, which is equivalent to 1 to 10 weight percent based on solids in the crystalline slurry. More preferably, the fiber will be present as from 1.5 to 6 weight percent of the finished product and most preferably at about 5 weight percent of the finished product.

In a preferred embodiment, where it is intended that the insulating block will be placed in service where the hot face temperature will be in excess of the melting point of the poly(ethylene terephthalate) fiber (e.g., in excess of 450° to 480° F for "Dacron" fiber), the poly(ethylene terephthalate) fiber may be replaced to the extent of up to 70% by glass fiber of the same approximate dimensions. The glass fiber provides reinforcement to that portion of the insulation block in which the temperature exceeds the melting point of the poly(ethylene terephthalate) fiber, while the poly(ethylene terephthalate) fiber provides reinforcement for the remainder of the block. Even under such conditions the poly(ethylene terephthalate) fiber is superior to organic fibers such as rayon, for the poly(ethylene terephthalate) fiber can tolerate higher internal temperatures in the block than can such other materials. When the glass fiber is present the total fiber content will still be in the range of from 1 to 10 weight percent of the finished product. The glass fiber may be present as up to 70% of the total fiber content and preferably will be present in the range of from 20 to 70%. In other words, the composition will contain 1 to 10 weight percent poly(ethylene terephthalate) fibers, preferably 3–7 weight percent, and 0–7 weight percent, preferably 2–7 weight percent of glass fibers, with a total fiber content of 1–10 weight percent. As typical examples, compositions containing 2% by weight of poly(ethylene terephthalate) fiber and 3% by weight of glass fiber; 2% by weight of poly(ethylene terephthalate) fiber and 4% by weight of glass fiber; or 1% by weight of poly(ethylene terephthalate) fiber and 2% by weight of glass fiber are all eminently suitable for use in the present invention.

In a typical example of the improvement of this invention, 1,500 pounds of lime and 1,400 pounds of silica were reacted under hydrothermal conditions in the presence of 180 psig saturated steam for four hours, in a solution containing about 6 parts of water per part of solids. After the reaction slurry was cooled and diluted, 30 pounds of "Dacron" poly(ethylene terephthalate) fibers having a length of from ¼ to ½ inch and a denier of 1.5, and 60 pounds of ¼ inch long E glass having a filament diameter of about 10 microns were added. The solids and the slurry were thereafter molded into a number of shaped insulating blocks, including half cyclinders suitable for joining together in pairs as pipe insulation.

What is claimed is:

1. In a process for reacting lime and a siliceous material under hydrothermal conditions in aqueous solution to produce an aqueous slurry of calcium silicate hydrate crystals, with subsequent molding of the crystals to a desired shape and drying of the shape-molded product to form a shaped object of light weight calcium silicate hydrate suitable for use as thermal insulation, the improvement which comprises incorporating into said aqueous slurry of calcium silicate hydrate crystals 1 to 10% by weight based on solids of poly(ethylene terephthalate) fibers, said fibers having a length of from ⅛ to 1 inch and a denier of from 0.5 to 5.

2. The improved process of claim 1 wherein said fibers are incorporated into said slurry in an amount of 1.5 to 6 weight percent based on solids.

3. The improved process of claim 1 wherein said fibers are of a length of from ¼ to ½ inch and of a denier of from 1 to 3.

4. The improved process of claim 1 wherein the improvement further comprises incorporating into said slurry glass fibers in an amount of up to 7 percent by weight based on solids, with said poly(ethylene terephthalate) fibers being incorporated in an amount such that the total fiber content of said slurry is 1 to 10 percent by weight based on solids.

5. The improved process of claim 4 wherein said glass fibers have a length in the range of ⅛ to 1 inch and a diameter of from 5 to 15 microns.

6. The improved process of claim 4 wherein said glass fibers are present as 2 to 7 weight percent of the slurry based on solids.

7. In a shaped object comprising calcium silicate hydrate and suitable as a thermal insulation, the improvement which comprises the inclusion in said object of 1 to 10 weight percent of poly(ethylene terephthalate) fibers, said fibers having a length of from ⅛ to 1 inch and a denier of from 0.5 to 5.

8. In the improved product of claim 7 wherein the improvement further comprises the inclusion in said object of up to 7 weight percent of glass fiber, and said poly(ethylene terephthalate) fiber being present in an amount such that the total fiber content of said object is in the range of from 1 to 10 percent by weight.

9. In the improved object of claim 8, the improvement further comprising said glass fiber being present as 2 to 7 weight percent of said object.

* * * * *